US012641285B2

(12) United States Patent
Van Geest et al.

(10) Patent No.: US 12,641,285 B2
(45) Date of Patent: May 26, 2026

(54) ENCODING AND DECODING IMMERSIVE VIDEO

(71) Applicant: KONINKLIJKE PHILIPS N.V., Eindhoven (NL)

(72) Inventors: Bartolomeus Wilhelmus Damianus Van Geest, Veldhoven (NL); Bart Kroon, Eindhoven (NL); Christiaan Varekamp, Veldhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 222 days.

(21) Appl. No.: 18/028,828

(22) PCT Filed: Sep. 23, 2021

(86) PCT No.: PCT/EP2021/076133
§ 371 (c)(1),
(2) Date: Mar. 28, 2023

(87) PCT Pub. No.: WO2022/069325
PCT Pub. Date: Apr. 7, 2022

(65) Prior Publication Data
US 2023/0370635 A1      Nov. 16, 2023

(30) Foreign Application Priority Data

Sep. 30, 2020      (EP) .................................... 20199141

(51) Int. Cl.
*H04N 19/597* (2014.01)
*H04N 13/178* (2018.01)
(Continued)

(52) U.S. Cl.
CPC ......... *H04N 19/597* (2014.11); *H04N 13/178* (2018.05); *H04N 13/351* (2018.05); *H04N 19/184* (2014.11)

(58) Field of Classification Search
CPC .. H04N 13/178; H04N 13/351; H04N 19/184; H04N 19/597
See application file for complete search history.

(56) References Cited

U.S. PATENT DOCUMENTS

| | | | |
|---|---|---|---|
| 12,120,326 B2 | 10/2024 | Tian et al. | |
| 2017/0188002 A1 | 6/2017 | Chan et al. | |

(Continued)

FOREIGN PATENT DOCUMENTS

| | | |
|---|---|---|
| EP | 3515082 A1 | 7/2019 |
| WO | 2019078696 A1 | 4/2019 |
| WO | 2019197708 A1 | 10/2019 |

OTHER PUBLICATIONS

"Multi-Pass Renderer in MPEG Test Model for Immersive Video"— Salahieh et al., 978-1-7281-4704-8/19/$31.00 A © 2019 IEEE. (Year: 2019).*

(Continued)

*Primary Examiner* — Mainul Hasan

(57) ABSTRACT

Concepts for encoding and decoding multi-view data for immersive video are disclosed. In an encoding method, metadata is generated comprising a field indicating if a patch data unit of the multi-view data comprises in-painted data for representing missing data. The generated metadata provides a means of distinguishing patch data units comprising original texture and depth data from patch data units comprising in-painted data (e.g. in-painted texture and depth data). The provision of such information within the metadata of immersive video may address problems associated with blending and pruned view reconstruction. Also provided are an encoder and a decoder for multi-view data for immersive video, and a corresponding bitstream, comprising metadata.

17 Claims, 4 Drawing Sheets

(51) Int. Cl.
    H04N 13/351     (2018.01)
    H04N 19/184     (2014.01)

(56)           References Cited

U.S. PATENT DOCUMENTS

| | | | |
|---|---|---|---|
| 2019/0238819 A1 | 8/2019 | Furukawa et al. | |
| 2019/0320164 A1* | 10/2019 | Salahieh | H04N 13/156 |
| 2020/0014940 A1* | 1/2020 | Dawar | G06T 9/001 |
| 2020/0043217 A1 | 2/2020 | Cilingir et al. | |
| 2020/0045348 A1* | 2/2020 | Boyce | H04N 21/435 |
| 2020/0104976 A1 | 4/2020 | Mammou et al. | |
| 2020/0137382 A1 | 4/2020 | Zhao et al. | |
| 2021/0006834 A1* | 1/2021 | Salahieh | H04N 19/597 |
| 2021/0329209 A1* | 10/2021 | Lee | H04N 19/70 |
| 2023/0247222 A1* | 8/2023 | Boyce | G06V 10/764 |
| | | | 375/240.12 |

OTHER PUBLICATIONS

"Towards 3DoFC 360 Video Streaming System for Immersive Media"—Jeong et al., accepted Sep. 17, 2019, date of publication Sep. 20, 2019. (Year: 2019).*

"Review and Preview: Disocclusion by Inpainting for Image-Based Rendering"—Tauber et al., IEEE Transactions on Systems, Man, and Cybernetics—Part C: Applications and Reviews, vol. 37, No. 4, Jul. 2007. (Year: 2007).*

"An Immersive Video Experience With Real-Time View Synthesis Leveraging the Upcoming MIV Distribution Standard"—Fleureau et al., Copyright notice: 978-1-7281-1485-9/20/$31.00 Â © 2020 IEEE (Year: 2020).*

Ozcinar et al "Adaptive Delivery of Immersive 3d Multi-View video over the Internet".

International Search Report and Written Opinion from PCT/EP2021/076133 mailed Dec. 17, 2021.

5th working draft of the MPEG Immersive Video (MIV) standard [ISO/IEC JTC1 SC29 WG11 (MPEG) N19212].

Information technology—Coded Representation of Immersive Media—Part 5: Visual Volumetric Video-based Coding (V3C) and Video-based Point Cloud Compression (V-PCC.

Test Model 5 for Immersive Video, ISO/IEC JTC 1/SCWG11 (May 16, 2020).

Sonneveldt et al "Server-Side Impainting" 132. MPEG Meeting Oct. 7, 2020.

\* cited by examiner

305

Texture & Depth

Metadata

140

310

Receive

320

Decode

330

Output

Target view

ENCODING AND DECODING IMMERSIVE VIDEO

CROSS-REFERENCE TO PRIOR APPLICATIONS

This application is the U.S. National Phase application under 35 U.S.C. § 371 of International Application No. PCT/EP2021/076133, filed on Sep. 23, 2021, which claims the benefit of EP Patent Application No. EP 20199141.1, filed on Sep. 30, 2020. These applications are hereby incorporated by reference herein.

FIELD OF THE INVENTION

The present invention relates to immersive video. It relates particularly to methods and apparatuses for encoding and decoding multi-view data for immersive video.

BACKGROUND OF THE INVENTION

Immersive video, also known as six-degree-of-freedom (6DoF) video, is video of a three-dimensional (3D) scene that allows views of the scene to be reconstructed for viewpoints that vary in position and orientation. It represents a development of three-degree-of-freedom (3DoF) video, which allows views to be reconstructed for viewpoints with arbitrary orientation, but only at a fixed point in space. In 3DoF, the degrees of freedom are angular—namely, pitch, roll, and yaw. 3DoF video supports head rotations—in other words, a user consuming the video content can look in any direction in the scene, but cannot move to a different place in the scene. 6DoF video supports head rotations and additionally supports selection of the position in the scene from which the scene is viewed.

To generate 6DoF video requires multiple cameras to record the scene. Each camera generates image data (often referred to as texture data, in this context) and corresponding depth data. For each pixel, the depth data represents the depth at which the corresponding image pixel data is observed. Each of the multiple cameras provides a respective view of the scene.

An issue for the generation of a target view is that only image data which is available in the views from the source cameras can be synthesized. Some image regions of the target view may be unavailable from the transmitted video streams (e.g. because they weren't visible from any of the source cameras). To address this issue, it is typical to fill or 'in-paint' those image regions using available colour data from other background regions. Such 'in-painting' it is carried out as a post-processing step (e.g. at the decoder) after the view-synthesis stage. This is a complex operation, especially when the size of the region(s) of missing data is large.

An alternative to in-painting during post-processing is to undertake in-painting during data encoding (e.g. at the encoder) and then pack the resulting texture atlases together with the usual patches. However, this has associated disadvantages, including the following:

(i) The in-painted image regions involve textures as well as depth information. Depth information is required for the necessary re-projection. Besides the texture information, the in-painted depth information is also considered of less quality than the original depth information. Consequently, the re-projection of regions of in-painted data is less accurate.

(ii) During reconstruction of pruned (without redundant parts) source views from encoded data, a problem arises when the texture atlases are packed with additional in-painted image regions. Both in-painted patches and patches with original image data may map to the same position in the reconstructed views, causing a conflict.

(iii) Packing the additional in-painted textures within the video streams increases their bitrate. It also increases the required (active) frame size of the texture and depth atlases, i.e. the pixel-rate. This places increased resource requirement on the client device (which will typically only have limited resources).

SUMMARY OF THE INVENTION

The invention is defined by the claims.

According to examples in accordance with an aspect of the invention, there is provided a method of encoding multi-view data for immersive video according to claim 1.

Proposed concepts aim to provide schemes, solutions, concepts, designs, methods and systems pertaining to encoding multi-view data for immersive video. In particular, embodiments aim to provide concepts for distinguishing patch data units holding original texture and depth information from patch data units holding in-painted data. As such the blending and pruned view reconstruction problems can be addressed. In particular, embodiments propose to use the metadata of immersive video to provide a way to indicate if a patch data unit of multi-view data comprises in-painted data for representing missing data. In this way, an existing feature of immersive video can be leveraged to indicate the presence of in-painted data in the multi-view data.

For instance, according to proposed embodiments, the metadata of immersive video can be generated to include a field (i.e. syntax element, metadata field, metadata element or input element that is populated with data) indicating if a patch data unit comprises in-painted data.

The field may comprise a set of at least two allowable values. The first value of the set may indicate that the patch data unit of the multi-view data comprises original image data captured from at least one viewpoint, and a second value of the set indicates that the patch data unit of the multi-view data comprises in-painted data. For instance, the field may comprise a binary flag or Boolean indicator, and thus comprise a simple bit (indicating Boolean value '0'/ 'low' or '1'/'high'). The field may have the form of a syntax element in a bitstream. Alternatively, the field is derived from other fields. For example, a first other field may represent the total number of views present in the bitstream, and a second other field may indicate the total number of views that are not in-painted. When a view index is beyond the total number of views that are not in-painted, then the (derived) field is '1', otherwise it is '0', or vice versa. Such implementations may therefore only require minimal or minor modification to conventional immersive video metadata.

However, in some embodiments, the set of allowable values may comprise more than two allowable values. For example, the value of the field may be indicative of a Level of Detail (LoD) for the patch data unit. One value of the field may indicate that the patch data unit comprises original/ acquired data that is of the highest quality (and thus highest priority for use, i.e. has no loss). Another value of the field may indicate that the patch data unit comprises data synthesized from acquired data (i.e. has some less on fidelity, but is still of good quality). Yet another value of the field may indicate that the patch data unit comprises in-painted data that is of the lowest quality (and thus lowest priority for use, i.e. in-painting loss). In this way, the field may provide further information about the in-painted data (such as the LoD detail of the in-painted data). Some embodiments may therefore employ a field that has three or more allowable values. The field may thus comprise a plurality of bits (e.g. one or more Bytes).

The multi-view data may be encoded. The field may then be associated with a frame of the encoded multi-view data and comprise a description (or definition) of one or more patch data units of the frame comprising in-painted data.

In some embodiments, the field comprises an identifier or address of a stored value. Such a stored value may, for example, comprise a rendering parameter value. That is, the field may include information enabling one or more values to be retrieved or 'looked-up'. For instance, different rendering parameter sets may be predefined and each stored using a respective unique identifier (e.g. address). An identifier/address included in the field for a patch data unit may then be used to identify and retrieve a parameter set (i.e. set of parameter values) for use with the patch data unit. That is, a field associated with a patch data unit may comprise an identifier or address for locating additional information relating to the patch data unit.

Some embodiments may further comprise the preceding steps of: determining if a patch data unit of multi-view data comprises either original image data captured from at least one viewpoint or in-painted data for representing missing image data; and defining, based on a result of determining, a field value for indicating if the patch data unit comprises original image data or in-painted data. That is, some embodiments may include a process of: analysing a patch data unit to determine if it comprises in-painted data or not and then setting the value of the field according to the analysis result. Such a process may, for example, be undertaken when information about in-painted data in the multi-view data has not been otherwise provided by alternative means (e.g. via a user input or from a separate data analysis process).

According to some embodiments, the field value may comprise a view parameter. Determining if a patch data unit of multi-view data comprises either original image data captured from at least one viewpoint or in-painted data for representing missing image data may then comprise: determining that the patch data unit of multi-view data comprises in-painted data responsive to identifying that the patch data unit comprises a reference to an in-paint view. In such embodiments, the field may be part of the view parameters, and a patch may be identified as an in-painted patch when it references an in-paint view. This may be of particular benefit for implementations that create a synthetic background view which is then in-painted to patch data units.

Further, embodiments may also include the step of defining, based on a result of determining, a level-of detail, LoD, value representing a data subsampling factor to be applied to the patch data unit. By employing a LoD feature, embodiments may support downscaling of an in-painted patch data unit.

The multi-view data may be video data comprising a plurality of source views, each source view comprising texture values and depth values. In other words, a method of encoding multi-view data as summarized above can be applied in a method of encoding immersive video.

According to another aspect of the invention, there is provided a method of decoding multi-view data for immersive video according to claim 8. Proposed concepts thus aim to provide schemes, solutions, concepts, designs, methods and systems pertaining to decoding multi-view data for immersive video. In particular, embodiments aim to provide concepts for decoding a bitstream comprising multi-view data and associated metadata encoded according to proposed embodiments. In such concepts, a rendering parameter of the patch data unit is set based on the field indicating the patch data unit of the multi-view data comprises in-painted data. In this way, the proposed field of the metadata associated with the multi-view data can be leveraged to control a view synthesis for a patch data unit, such as a rendering priority, rendering order or blending (mixing) weight for example.

By way of example, in an embodiment, the field may comprise an identifier of a rendering parameter value. Setting the rendering parameter of the patch data unit may then comprise determining, based on the identifier, the rendering parameter value; and setting the rendering parameter to the determined rendering parameter value. In this way, proposed embodiments may be configured to use the field to 'look up' one or more rendering parameters. For instance, multiple rendering parameter sets may be predefined and each have respective unique identifier, and a parameter set may then selected for use with a patch data unit according to its identifier being included in the field for that patch data unit.

In some embodiments, the rendering parameter comprises a rendering priority. Setting the rendering parameter of the patch data unit may then comprise, responsive to the field indicating the patch data unit of the multi-view data comprises in-painted data, setting a rendering priority of the patch data unit to a first priority value; and responsive to the field indicating the patch data unit of the multi-view data comprises original image data captured from at least one viewpoint, setting the rendering priority of the patch data unit to a second, different priority value. An importance, or 'weight', of rendering a patch data unit may therefore be controlled according to whether the field associated with the patch data unit indicates it comprises in-painted data. This may allow for an ordering of rendering or view synthesis to be controlled according to preferences or requirement relating to in-painted data.

Also disclosed is a computer program comprising computer code for causing a processing system to implement a method as summarized above when said program is run on the processing system. The computer program may be stored on a computer-readable storage medium. This may be a non-transitory storage medium.

Also provided is an encoder for encoding multi-view data for immersive video according to claim 14.

Yet further provided is a decoder for decoding multi-view data for immersive video according to claim 16.

According to still another aspect, there is provided a bitstream comprising multi-view data for immersive video and associated metadata according to claim 17.

The bitstream may be encoded and decoded using methods as summarized above. It may be embodied on a computer-readable medium or as a signal modulated onto an electromagnetic carrier wave.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

Figure 1:
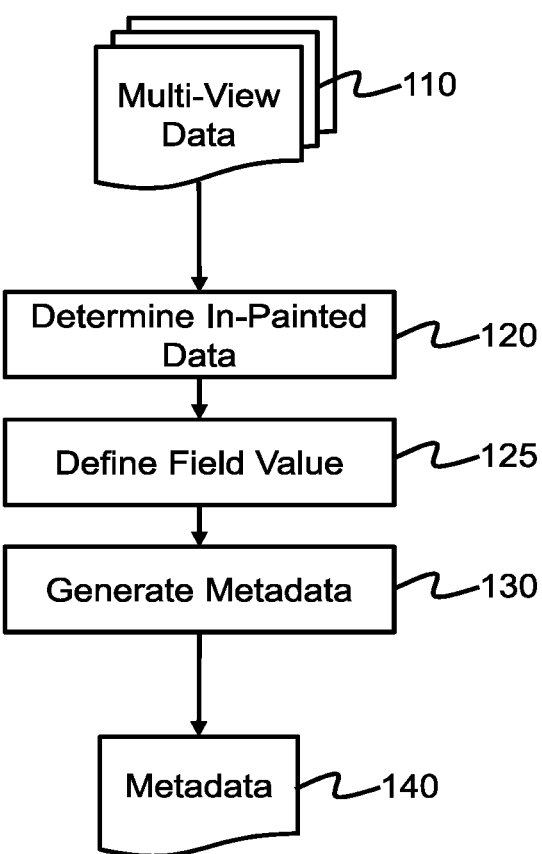
FIG. 1 is a flowchart of a method of encoding multi-view data for immersive video according to a first embodiment of the invention.

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. The mere fact that certain measures are recited in mutually different dependent claims does not indicate that a combination of these measures cannot be used to advantage.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality.

It should be understood that the Figures are merely schematic and are not drawn to scale. It should also be understood that the same reference numerals are used throughout the Figures to indicate the same or similar parts.

Implementations in accordance with the present disclosure relate to various techniques, methods, schemes and/or solutions pertaining to encoding and decoding multi-view data for immersive video. According to proposed concepts, a number of possible solutions may be implemented separately or jointly. That is, although these possible solutions may be described below separately, two or more of these possible solutions may be implemented in one combination or another.

MPEG Immersive Video (MIV) has three data streams: texture data, depth data (also called geometry or range data) and metadata. Content is encoded using standard compression codec (for instance, HEVC) and metadata includes camera parameters and patch data.

The terms "patch" or "patch data unit" refer to a (rect-angular) region (i.e. patch) in the encoded multi-view frame (atlas) of immersive video. Thus, pixels in a patch refer to a part in a certain source view and are transformed and projected equally. A patch data unit may correspond to a frustum slice or an entire projection plane. That is, a patch is not necessarily limited to being a region that is smaller in size than a whole frame (i.e. a sub-region of a frame), but may instead comprise an entire frame.

On the source side, multi-view data corresponds to full (i.e. captured) views. In immersive video, an encoded multi-view frame is typically referred to as an atlas and consists of one or more texture and depth (geometry) images.

Also, reference to 'rendering priority' should be taken to refer to an importance or relative weighting, rather than an order. Thus, although a patch data unit being allocated a high rendering priority may result in that patch data unit being moved up in order towards the front of a rendering queue, it may not necessarily always be the case. Rather, although a higher rendering priority may influence a rendering order, it may not ultimately change or alter a rendering order due to the relative importance or weighting of other factors or patch data units. That is, priority does not necessarily imply temporal ordering. A render order may be dependent on embodiment and different rendering orders of in-painted data and original data are possible.

According to the proposed concept(s), methods of encoding and decoding multi-view data for immersive video are disclosed. In a proposed encoding method, metadata is generated comprising a field indicating if a patch data unit of the multi-view data comprises in-painted data for representing missing data. The generated metadata provides a means of distinguishing patch data units comprising original texture and depth data from patch data units comprising in-painted data (e.g. in-painted texture and depth data). The provision of such information within the metadata of immersive video may address problems associated with blending (as part of the target view-synthesis) and pruned view reconstruction.

By providing metadata including a field indicating if a patch data unit of the multi-view data comprises in-painted data, embodiments may provide a means for indicating the location(s) of in-painted data within immersive video. This may also allow patch data unit with in-painted data to employ a reduced level of detail, LoD, thereby enabling reductions in required bit- and pixel-rate.

Thus, according to the proposed concept(s), metadata of immersive video may be enhanced to indicate the presence, location and extent of in-painted data within multi-view data of immersive video. A proposed encoding method may output (enhanced) metadata indicating in-painted data in one or more patches. This (enhanced) metadata can be used by a corresponding decoding method, to render or synthesize views. Also provided are an encoder and a decoder for multi-view data, and a corresponding bitstream comprising such (enhanced) metadata.

Figure 2:
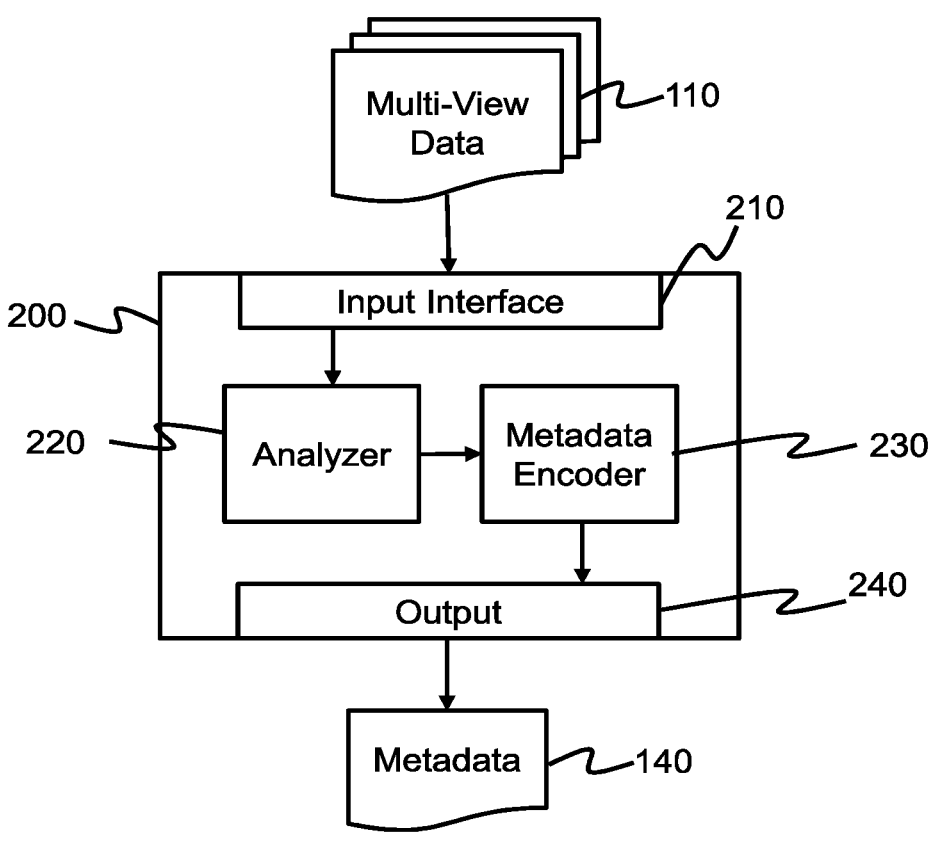
FIG. 2 is a block diagram of an encoder according to an embodiment, which is configured to carry out the method illustrated in FIG. 1.

FIG. 1 illustrates an encoding method according to the first embodiment of the present invention. FIG. 2 is a schematic block diagram of an encoder for carrying out the method of FIG. 1.

The encoder 200 comprises an input interface 210; an analyzer 220; a metadata encoder 230; and an output 240.

In step 110, the input interface 210 receives multi-view data comprising patch data units. In the present embodiment, the multi-view data is immersive video data comprising a plurality of source views. Each source view comprises texture values and depth values. Encoding of the texture value and depth values is outside the scope of the present invention and will not be discussed further here. The input interface 210 is coupled to the analyzer 220

In step 120, the analyzer 220 determines if a patch data unit of the multi-view data comprises either original image data captured from at least one viewpoint or in-painted data for representing missing image data.

In step 125, the analyzer defines, based on a result of determining, a field value for indicating if the patch data unit comprises original image data or in-painted data.

Therefore, the task of the analyzer is to identify it patch data unit comprise original image data or in-painted data and to indicate the result of such analysis. The analyzer 220 provide the results of the analysis to the metadata encoder 230

In step 130, the metadata encoder 230 generates metadata 140 comprising a field indicating if a patch data unit of the multi-view data comprises in-painted data for representing missing data. In this example, a field comprises a binary flag that has two allowable values (e.g. a single bit with allowable values of '0' (logical low) and '1' (logical high). The first value '0' indicates that the patch data unit of the multi-view data comprises original image data captured from at least one viewpoint. The second value '1' of indicates that the patch data unit of the multi-view data comprises in-painted data.

Accordingly, the task of the metadata encoder 230 is to generate (enhanced) metadata that includes a binary flag indicating if a patch data unit of the multi-view data comprises in-painted data for representing missing data. This (enhanced) metadata includes information defining the patch data units that comprise in-painted data. Although not the case in this embodiment, the field(s) of the metadata may be configured to indicate/include further information about in-painted data of a patch data unit, such as a LoD of the in-painted data for example. However, this may not be necessary in some embodiments. For instance, the LoD of in-painted data may be pre-determined and/or normalized.

The output 240 generates and outputs the generated (enhanced) metadata. It may output the metadata, either as part of a bitstream comprising the multi-view data (i.e. texture and depth data streams) or separately from the bitstream.

Figure 3:
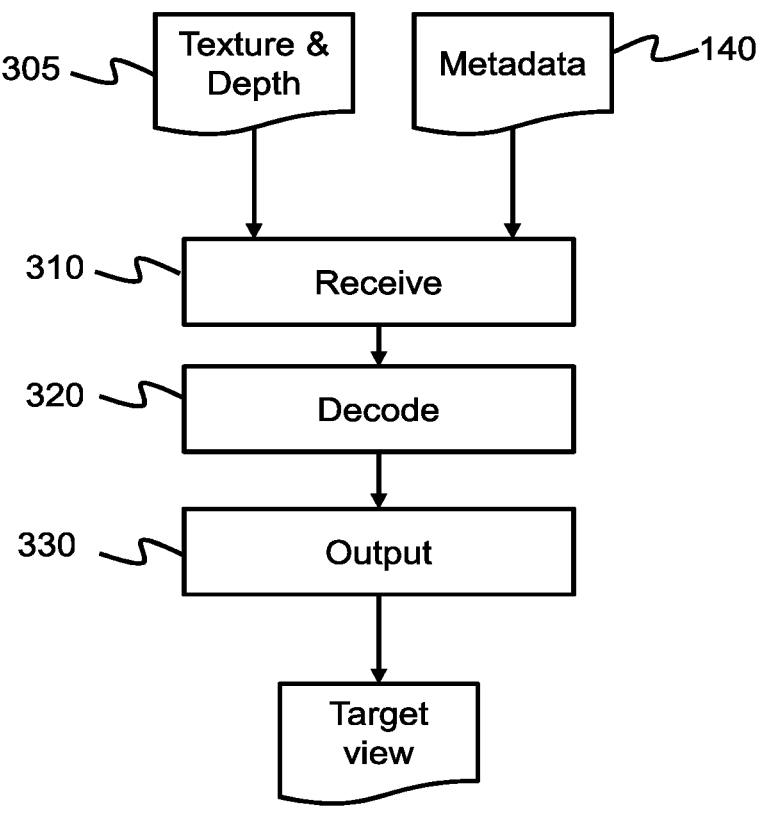
FIG. 3 is a flowchart illustrating a method of decoding multi-view data for immersive video according to a second embodiment of the invention.
Figure 4:
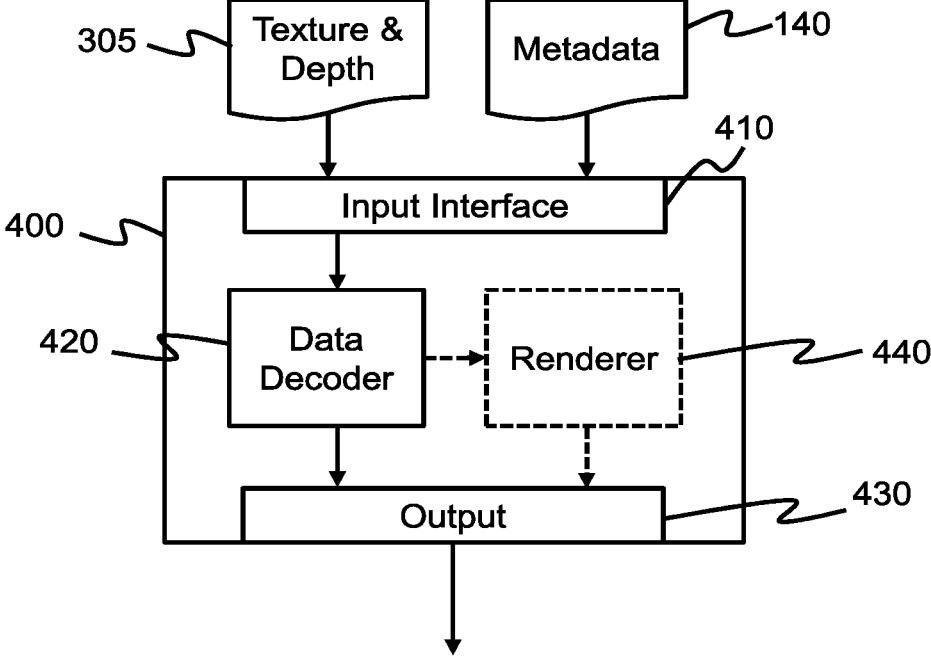
FIG. 4 is a block diagram of a decoder according to an embodiment, which is configured to carry out the method illustrated in FIG. 3.

FIG. 3 is a flowchart illustrating a method of decoding encoded multi-view data for immersive video according to a second embodiment of the invention. FIG. 4 is a schematic block diagram of a decoder for carrying out the method of FIG. 3.

The decoder 400 comprises an input interface 410; a metadata decoder 420; and an output 430. Optionally, it may also comprise a renderer 440.

In step 310, the input interface 410 receives a bitstream comprising texture and depth data 305. The input interface 410 also receives metadata 140 describing the bitstream. The metadata may be embedded in the bitstream or may be separate. The metadata 140 in this example is created according to the method of FIG. 1 described above. Thus, the metadata comprises a field indicating if a patch data unit of the multi-view data comprises in-painted data for representing missing data. Note that the metadata input to the decoder 400 will typically be a version of the metadata output by the encoder 300 that may have subsequently been subjected to compression (and possibly error-prone communication through a transmission channel).

In step 320, the metadata decoder 420 decodes the metadata. This involves setting a rendering parameter of a patch data unit based on the associated field indicating if the patch data unit of the multi-view data comprises in-painted data. In this example, the rendering parameter is a rendering priority. Responsive to the field indicating the patch data unit comprises in-painted data, the rendering priority of the patch data unit is set to a first priority value (e.g. low). Responsive to the field indicating the patch data unit comprises original image data captured from at least one viewpoint, the rendering priority of the patch data unit is set to a second, higher priority value (e.g. high).

The metadata decoder 420 provides the rendering parameter(s) to the output 430. The output 430 outputs the rendering parameter(s) (step 330).

If the decoder 400 includes the optional renderer 440, the data decoder 420 may provide the decoded rendering parameter(s) to the renderer 440, which reconstructs one or more views according to the rendering parameter(s). In this case, the renderer 440 may provide the reconstructed view to the output 430, and the output 430 may output this reconstructed view (for example, to a frame buffer).

There are various ways in which the fields of the metadata can be defined and user. Some of these ways will now be discussed in more detail.

Alternative A

In some embodiments, the field of the metadata comprises a binary flag (e.g. a single bit) that indicates that the patch data unit of the multi-view data comprises either: original image data captured from at least one viewpoint; or in-painted data for representing missing data.

At the encoder: The flag is set (i.e. asserted, set to logical high, set to value '1', etc.) when a patch data unit contains original content, and the flag is unset (i.e. negated, set to logical low, set to value '0', etc.) when the patch data unit contains in-painted content.

At the decoder: When the texture of a patch is blended with the flag unset, the blending weight is set to a low value. Consequently, when other texture data (with the flat set) is mapped to the same output location, it effectively gets a high blending priority resulting in a more optimal quality.

When the decoder uses 'pruned view reconstruction' prior to the actual view-synthesis: The reconstruction process now takes place by selectively allowing patches with the flag set only. Effectively ignoring the in-painted data (i.e. treating the in-painted data as low priority). Subsequently, in the actual view-synthesis, the patches holding the in-painted content (i.e. those with the flag not set) are only used for the regions of missing data.

Alternative B

In an alternative embodiment, the metadata is extended such that, per atlas frame, an 'inpaint-patches-region' (e.g. rectangular) is specified that is dedicated for patches that contain in-painted data. Such a region can be initially specified with a user parameter (e.g. as a percentage of the available atlas frame size), or it can be determined automatically to balance the available space (determined by the maximum pixel-rate) for original data versus in-painted data. In this way, the field of the metadata is associated with a frame of the encoded multi-view data and comprises a description (i.e. definition) of one or more patch data units of the frame comprising in-painted data.

At the encoder: The 'inpaint-patches-region' is taken into account. Patch data units with in-painted content are placed inside it, other patches (with original content) are left outside the region.

At the decoder: The same behavior as described in the preceding embodiment described above also applies. The video encoder may be instructed to encode this region with a higher quantization value (i.e. lower quality) for texture and/or depth video components.

For implementations of MIV where multiple atlas components are packed into a video frame, the patch data units may be part of a separate atlas, and that atlas could be packed into a video frame. That is, one or more parts of video frames can be reserved for video data relating to these in-painted patch data units.

It is noted that alternative A requires the least amount of change to the current MIV (draft) standard, since it only adds a flag associated with the patch data unit(s). It also allows all patch data units to packed together more efficiently (compared to alternative B). Using a quality value (e.g. a byte)

instead of a quality flag (e.g. a bit) may have an additional benefit that the quality can be further optimized.

Alternative B does not require a metadata syntax per patch data unit and may therefore require a lower metadata bitrate. Furthermore, the patches holding the in-painted content can be compactly packed together, which may allow for creation of a distinct mesh of triangles to be used for a dedicated in-paint render stage (e.g. first creating a backdrop with in-painted data and then synthesizing using the usual patch data).

As noted above in the background section, in-painting missing data at the encoder increases the bit- and pixel-rate. Extensions and/or modifications to proposed embodiments which aim to limit this increase will now be described.

Downscaling Patches that Contain In-Painted Content

It is proposed that the in-painted content may be packed into patches using a smaller scale (i.e. reduced LoD) so as to reduce the bit- and pixel-rate. In particular, it is proposed that some embodiments may be configured to specify the LoD per patch data unit that that patch data units with in-painted content can employ a lower LoD to reduce bit and pixel-rate.

An employed transmission standard may support syntax/ semantics whereby a LoD per patch data unit definition is enabled by default for in-painted patch data units and disabled by default for regular patches (i.e. patches consisting of original data). Default LoD parameter values may be specified for bitstreams that contain in-paint patches.

A typical implementation may be configured to subsample in-painting data by a factor of two, and to not subsample regular patches. However, embodiments may still be configured to override the default LoD parameter value on a patch-per-patch basis (e.g. to employ a lower LoD for low-texture parts of a scene).

Employing Low-Resolution Mesh to Represent Background

A specific mesh with a reduced/sparse set of vertices may be employed for representing missing background content. The vertices may be accompanied with color data (or a reference to color data in existing textures). Such an approach provides the benefit that a relatively large background area can be represented with only a small number of vertices.

Such a low-resolution mesh may be constructed from the depth maps of the source views at the encoder side. However, this may not always be the case and a graphics model with texture may be used as background mesh. That is, a combination of artificial (graphics) and real camera data may be used.

The low-resolution mesh with associated texture does not need to be represented in the same projective space as the source views. For instance, when the source views have a perspective projection with given field of view (FoV), the low-resolution background mesh may be defined with respect to a perspective projection with a larger FoV to avoid uncovering at the boundaries of the viewport. It may also be useful to select a spherical projection for the background mesh.

A low-resolution background mesh may require associated metadata to be defined/generated. Some embodiments may therefore include a step of generating metadata which includes a field for defining and/or describing an associated low-resolution mesh. For example, in the simplest form, the field may comprise a binary flag that indicates the presence/ existence of a background mesh. The field may alternatively be of a form which allows for further information to be indicated, such as a location of the depth and texture data and/or specification projection parameters. If such additional information (e.g. rendering parameters are absent), default parameters may be employed.

In example embodiments described above, the field has been described as comprising a binary flag or Boolean indicator. However, it is to be understood that the propose field for indicating if a patch data unit of the multi-view data comprises in-painted data may be configured to provide additional information beyond a simple binary indication. For example, in some embodiments, the field may comprise one or more bytes for indicating a large range of possible values. Also, the possible values may include identifiers or addresses of stored values, thus enabling information to be retrieved or 'looked-up'.

For instance, multiple rendering parameter sets may be predefined and each stored with a respective unique identifier (e.g. address). An identifier included in the field for a patch data unit may then be used to select and retrieve a parameter set for use with the patch data unit. That is, a field associated with a patch data unit may comprise an identifier or address for identifying additional information relating to the patch data unit.

It is of course possible that the proposed metadata field could be used to provide other information regarding an in-painted patch data unit. Such functions could include (but are not limited to): data quality; rendering preference; one or more identifiers, etc. Such information may be used in its entirety, or piecewise, combined with other information or rendering parameters.

Embodiments of the present invention rely on the use of metadata describing the patch data units. Since the metadata is important to the decoding process, it may be beneficial if the metadata is encoded with additional error detecting or error correcting codes. Suitable codes are known in the art of communications theory.

The encoding and decoding methods of FIGS. 1 and 3, and the encoder and decoder of FIGS. 2 and 4, may be implemented in hardware or software, or a mixture of both (for example, as firmware running on a hardware device). To the extent that an embodiment is implemented partly or wholly in software, the functional steps illustrated in the process flowcharts may be performed by suitably programmed physical computing devices, such as one or more central processing units (CPUs) or graphics processing units (GPUs). Each process—and its individual component steps as illustrated in the flowcharts—may be performed by the same or different computing devices. According to embodiments, a computer-readable storage medium stores a computer program comprising computer program code configured to cause one or more physical computing devices to carry out an encoding or decoding method as described above when the program is run on the one or more physical computing devices.

Storage media may include volatile and non-volatile computer memory such as RAM, PROM, EPROM, and EEPROM, optical discs (like CD, DVD, BD), magnetic storage media (like hard discs and tapes). Various storage media may be fixed within a computing device or may be transportable, such that the one or more programs stored thereon can be loaded into a processor.

Metadata according to an embodiment may be stored on a storage medium. A bitstream according to an embodiment may be stored on the same storage medium or a different storage medium. The metadata may be embedded in the bitstream but this is not essential. Likewise, metadata and/or bitstreams (with the metadata in the bitstream or separate from it) may be transmitted as a signal modulated onto an electromagnetic carrier wave. The signal may be defined according to a standard for digital communications. The carrier wave may be an optical carrier, a radio-frequency wave, a millimeter wave, or a near field communications wave. It may be wired or wireless.

To the extent that an embodiment is implemented partly or wholly in hardware, the blocks shown in the block diagrams of FIGS. 2 and 4 may be separate physical components, or logical subdivisions of single physical components, or may be all implemented in an integrated manner in one physical component. The functions of one block shown in the drawings may be divided between multiple components in an implementation, or the functions of multiple blocks shown in the drawings may be combined in single components in an implementation. Hardware components suitable for use in embodiments of the present invention include, but are not limited to, conventional microprocessors, application specific integrated circuits (ASICs), and field-programmable gate arrays (FPGAs). One or more blocks may be implemented as a combination of dedicated hardware to perform some functions and one or more programmed microprocessors and associated circuitry to perform other functions.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. If a computer program is discussed above, it may be stored/distributed on a suitable medium, such as an optical storage medium or a solid-state medium supplied together with or as part of other hardware, but may also be distributed in other forms, such as via the Internet or other wired or wireless telecommunication systems. If the term "adapted to" is used in the claims or description, it is noted the term "adapted to" is intended to be equivalent to the term "configured to". Any reference signs in the claims should not be construed as limiting the scope.

The invention claimed is:

1. A method comprising:
generating metadata,
    wherein the metadata comprises a field,
    wherein in the field comprises an indication,
    wherein the indication indicates if patch data of multi-view data comprises in-painted data,
    wherein the in-painted data represents missing data; and
encoding the multi-view data for immersive video,
    wherein the field comprises a plurality of allowable values,
    wherein a first value of the plurality of allowable values indicates that the patch data of the multi-view data comprises original image data captured from at least one viewpoint,
    wherein a second value of the plurality of allowable values indicates that the patch data of the multi-view data comprises in-painted data.

2. The method of claim 1, wherein the field comprises an identifier of a stored value or an address of a stored value.

3. The method of claim 2, wherein the stored value comprises a rendering parameter.

4. The method of claim 1, further comprising:
determining if the patch data of the multi-view data comprises either original image data captured from at least one viewpoint or in-painted data for representing missing image data; and
defining a field value, wherein the field value indicates if the patch data of the multi-view data comprises original image data or in-painted data based on the determining.

5. The method of claim 4 wherein the field value comprises a view parameter,
wherein the field comprises an identifier of a stored value or an address of a stored value,
wherein the determining comprises, determining that the patch data of the multi-view data comprises in-painted data when the patch data of the multi-view data comprises a reference to an in-painted view.

6. A method, comprising:
receiving a bitstream,
    wherein the bitstream comprises multi-view data and associated metadata,
    wherein the metadata comprises a field,
    wherein the field comprises an indication,
    wherein the indication indicates if patch data of the multi-viewdata comprises in-painted data for representing missing data,
    wherein the field comprises a plurality of allowable values,
    wherein a first value of the plurality of allowable values indicates that the patch data of the multi-view data comprises original image data captured from at least one viewpoint,
    wherein a second value of the plurality of allowable values indicates that the patch data of the multi-view data comprises in-painted data; and
decoding the patch data of the multi-view data,
    wherein the decoding comprises setting a rendering parameter of the patch data of the multi-view data,
    wherein rendering is based on the field.

7. The method of claim 6,
wherein the field comprises an identifier of a stored value or address of a stored value,
wherein setting the rendering parameter of the patch data of the multi-view data comprises:
    determining the stored value based on the identifier or address; and
setting the rendering parameter based on the stored value.

8. The method of claim 6,
wherein the rendering parameter of the patch data of the multi-view data comprises a rendering priority,
wherein setting the rendering parameter of the patch data of the multi-view data comprises:
    setting the rendering priority of the patch data of the multi-view data to a first priority value when the patch data of the multi-view data comprises in-painted data; and
    setting the rendering priority of the patch data of the multi-view data to a second priority value when the patch data of the multi-view data comprises original image data captured from at least one viewpoint.

9. The method of claim 6,
wherein the field is associated with a frame of the multi-view data,
wherein the field comprises a description of the patch data of the multi-view data of the frame,
wherein the frame comprises in-painted data,
wherein decoding the patch data of the multi-view data comprises:

analyzing the description to determine if the patch data of the multi-view data comprises in-painted data; and setting a rendering parameter of the patch data of the multi-view data based on the analyzing.

10. The method of claim 9, wherein the field value is a view parameter, wherein analyzing the description comprises determining if the description comprises a reference to an in-paint view.

11. A computer program stored on a non-transitory medium, wherein the computer program when executed on a processor performs the method as claimed in claim 1.

12. An encoder, comprising:

a processor circuit;

a memory circuit, wherein the memory circuit is arranged to store instructions for the processor circuit; and a metadata encoder circuit, wherein the metadata encoder circuit is arranged to generate metadata, wherein the metadata comprises a field, wherein the field comprises an indication, wherein the indication indicates if patch data of multi-view data comprises in-painted data for representing missing data, wherein the field comprises a plurality of allowable values, wherein a first value of the plurality of allowable values indicates that the patch data of the multi-view data comprises original image data captured from at least one viewpoint, wherein a second value of the plurality of allowable values indicates that the patch data of the multi-view data comprises in-painted data, wherein the processor circuit is arranged to encode the multi-view data for immersive video.

13. A decoder, comprising:

a processor circuit;

a memory circuit, wherein the memory circuit is arranged to store instructions for the processor circuit;

an input interface circuit, wherein the input interface circuit is arranged to receive a bitstream, wherein the bitstream comprises multi-view data and associated metadata, wherein the metadata comprises a field, wherein in the field comprises an indication, wherein the indication indicates if patch data of the multi-view data comprises in-painted data for representing missing data, wherein the field comprises a plurality of allowable values, wherein a first value of the plurality of allowable values indicates that the patch data of the multi-view data comprises original image data captured from at least one viewpoint, wherein a second value of the plurality of allowable values indicates that the patch data of the multi-view data comprises in-painted data; and a data decoder circuit, wherein the data decoder circuit is arranged to decode the patch data of the multi-view data, wherein the decoding comprises setting a rendering priority of the patch data of the multi-view data based on the field, wherein the rendering priority indicates that the patch data of the multi view data comprises in-painted data.

14. A computer program stored on a non-transitory medium, wherein the computer program when executed on a processor performs the method as claimed in claim 6.

15. The method of claim 1, wherein the value of the field is indicative of a level of detail for the patch data of the multi-view data.

16. The encoder of claim 12, wherein the field comprises an identifier of a stored value or an address of a stored value.

17. The decoder of claim 13, wherein the field comprises an identifier of a stored value or an address of a stored value.

* * * * *